(12) United States Patent
Tochigi et al.

(10) Patent No.: US 8,437,050 B2
(45) Date of Patent: May 7, 2013

(54) ILLUMINATOR, AND SPECTRAL APPARATUS AND IMAGE READING APPARATUS THEREWITH

(75) Inventors: Nobuyuki Tochigi, Kawaguchi (JP); Kazumi Kimura, Toda (JP); Tokuji Takizawa, Utsunomiya (JP); Masayasu Teramura, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 437 days.

(21) Appl. No.: 12/771,311

(22) Filed: Apr. 30, 2010

(65) Prior Publication Data
US 2010/0277775 A1    Nov. 4, 2010

(30) Foreign Application Priority Data

Apr. 30, 2009  (JP) .................................. 2009-110282
Apr. 2, 2010   (JP) .................................. 2010-085801

(51) Int. Cl.
*H04N 1/04* (2006.01)

(52) U.S. Cl.
USPC ............ 358/475; 358/471; 358/474; 358/498

(58) Field of Classification Search .................. 358/304, 358/471, 475, 498, 400, 474; 250/205.1, 250/216, 234
See application file for complete search history.

(56) References Cited

U.S. PATENT DOCUMENTS
2005/0088705 A1 *  4/2005  Okamoto et al. ............. 358/474

FOREIGN PATENT DOCUMENTS
JP    2000-137218 A    5/2000
JP    2005-265752 A    9/2005

* cited by examiner

*Primary Examiner* — Houshang Safaipour
(74) *Attorney, Agent, or Firm* — Rossi, Kimms & McDowell LLP (57) ABSTRACT

Provided is an illuminator including a light source unit having a light emitting surface, and a light guiding member guiding a light beam to an original disposed on an original plate. An intersection of a center axis of a light emitting surface and the original plate is separated from a reading position of the original in a sub scanning direction, the light guiding member includes an incident surface to which the light beam emitted from the light source unit is incident, a reflection surface that reflects the incident light beam, and an exiting surface exiting the incident light beam and the reflected light beam, and in the sub scanning section, the light beam having the highest light intensity in the light beams from the light source unit is deflected at the incident surface toward the reading position of the original with respect to the center axis.

6 Claims, 5 Drawing Sheets

ILLUMINATOR, AND SPECTRAL APPARATUS AND IMAGE READING APPARATUS THEREWITH

BACKGROUND OF THE INVENTION

1. Field of the Invention

The present invention relates to an illuminator, and a spectral apparatus and an image reading apparatus, in which the illuminator is used. Particularly, the invention relates to an illuminator that suitably guides a light beam from a light source unit with a light guiding member to illuminate an illumination object (original).

2. Description of the Related Art

Conventionally, in an illuminator such as an LCD backlight in which a low profile and uniform illuminance are required, there is proposed an illuminator that guides the light beam from the light source unit with the light guiding member to illuminate the illumination object (for example, see Japanese Patent Application Laid-Open No. 2000-137218).

There is proposed an illuminator in which the light guiding member, in which a shape of an incident surface to which the light beam is incident from the light source unit is changed, is used in order to enhance efficiency of a taking light quantity when the LED is used as the light source (for example, see Japanese Patent Application Laid-Open No. 2005-265752).

Japanese Patent Application Laid-Open No. 2000-137218 discloses an LCD backlight structure in which a reflector plate and a light taking surface are provided. The reflector plate reflects the light beam emitted from the light source. In the light taking surface, a side end face of a light induction plate is enlarged and largely extended to a side face of the light source to take a large amount of light beams. A thickness of the light induction plate except the light taking surface is decreased.

As to an illuminator that illuminates an image having color information in a spectral apparatus that obtains the color information, there is well known an illuminator that illuminates the illumination object with the light beam from the LED while the LED is disposed toward the illumination object instead of guiding the light beam from a xenon lamp through an optical fiber.

Japanese Patent Application Laid-Open No. 2005-265752 discloses a technique in which a sample image is illuminated with the light beam from the LED while the LED is inclined by 45 degrees with respect to the sample image.

Because the illuminator disclosed in Japanese Patent Application Laid-Open No. 2000-137218 is formed for the LCD backlight, the position of the illuminated surface does not vary. However, unfortunately illuminance is changed when the position in the thickness direction of the illuminated surface varies. In the disposition of the LED of Japanese Patent Application Laid-Open No. 2000-137218, because the light beam in the direction of the highest light intensity is substantially horizontally incident to the illuminated surface, the increase in illuminance is not expected in the illuminated surface.

In the illuminator disclosed in Japanese Patent Application Laid-Open No. 2005-265752, the LED is disposed in order to increase the illuminance while inclined by 45 degrees with respect to the sample image (illuminated surface). Therefore, the illuminance is largely changed when the position of the illuminated surface varies. Further, because the LED is inclined, it is necessary to incline the board retaining the LED, which results in a problem that an illumination unit is enlarged.

SUMMARY OF THE INVENTION

An object of the invention is to provide a compact, high-illumination-efficiency illuminator in which the change in illuminance can be decreased even if the reading position of the illuminated surface (original surface) varies, and a spectral apparatus and an image reading apparatus, in which the illuminator is used.

An illuminator according to the present invention includes a light source unit, and a light guiding member that guides a light beam to an original disposed on an original plate, wherein, in a sub scanning section, an intersection of a center axis of a light emitting surface of the light source unit and the original plate is separated from a reading position of the original in a sub scanning direction, the light guiding member includes an incident surface to which the light beam emitted from the light source unit is incident, a reflection surface that reflects the light beam incident from the incident surface, and an exiting surface that outputs the light beam incident from the incident surface and the light beam reflected from the reflection surface, and in the sub scanning section, the light beam having the highest light intensity in the light beams outputted from the light source unit is deflected at the incident surface toward the reading position of the original with respect to a center axis of the light emitting surface.

Incidentally, in the above illuminator, a condition of $$\frac{P}{2} < \frac{H - \frac{P\tan\theta}{2}}{\tan\left(90 - \theta + \arcsin\frac{\sin\theta}{n}\right)} < L + \frac{P}{2}$$

is preferably satisfied, where P (mm) is a length in the sub scanning direction of a light emitting surface of the light source unit, H (mm) is a distance in the original reading axis direction from the light emitting surface to the original reading position, L (mm) is a separation amount in the sub scanning direction between the center axis of the light emitting surface and the original reading axis, θ(°) is an angle formed between the light emitting surface and the incident surface in the sub scanning section, and n is a refractive index of a material of the light guiding member.

Further, the light source unit preferably includes an LED that has a characteristic in which a light intensity distribution of the emitted light beam varies according to an exit angle with respect to the light emitting surface.

Further, in the sub scanning section, the light source unit and the light guiding member are preferably disposed on both sides of the original reading axis.

According to one aspect of the present invention, there can be provided a spectral apparatus including the illuminator and a spectral unit that disperses a light beam diffused by the original illuminated with the light beam outputted from the illuminator into spectrum to output the spectrum to a light receiving unit.

Further, according to one aspect of the present invention, there can be provided an image reading apparatus including the illuminator, and an image formation optical system that forms an image of image information on the original illuminated with the light beam outputted from the illuminator to a reading unit.

Accordingly, the invention can provide the compact, high-illumination-efficiency illuminator in which the change in illuminance can be decreased even if the reading position of the illuminated surface (original surface) varies, and the spectral apparatus and the image reading apparatus, in which the illuminator is used.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
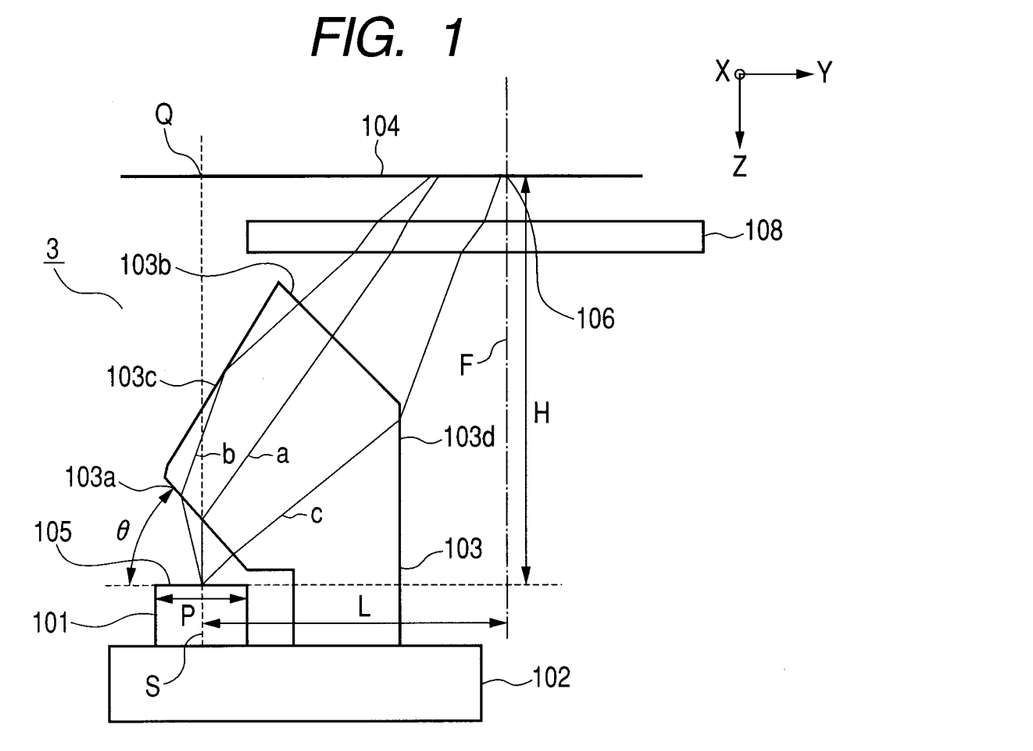
FIG. 1 is a sectional view illustrating sub scanning of an illuminator according to an embodiment of the invention.

FIG. 1 is a sectional view of a main part (sub scanning section) in a sub scanning direction (reading direction) of an illuminator according to an embodiment of the invention. FIG. 1 illustrates a state in which an original that is of the illumination object varies (flutters) in a thickness direction (Z-direction) in conveying the original.

Hereinafter, it is assumed that a Y-direction (sub scanning direction) is a conveying direction that is of the original reading direction, and it is assumed that an X-direction (main scanning direction) is a direction perpendicular to the Y-direction in the original surface, and it is assumed that the Z-direction is a direction normal to the original surface.

Referring to FIG. 1, an illuminator 3 includes a light source unit 101 and a light guiding member 103.

In the embodiment, for example, the light source unit 101 including a top view type LED is mounted on a board 102. The LED 101 has a characteristic in which a light intensity distribution of the emitted light beam varies according to an exit angle from a light emitting surface (light source surface) 105.

The light guiding member 103 having a later-described shape is mounted on the board 102 similarly to the light source unit 101, and the light guiding member 103 guides the light beam emitted from the light source unit 101 to an original (original surface and illuminated surface) 104 that is of an illumination object.

An original plate 108 includes a cover glass, and the original 104 is conveyed in a sub scanning direction (Y-direction) on a top portion of the original plate 108. In FIG. 1, it is assumed that F is a reading axis of the original 104.

A shape of the light guiding member 103 of the embodiment will be described below.

The light guiding member 103 includes an incident surface 103a to which the light beam is incident from the light source unit 101 in a refractive manner. The light guiding member 103 includes a total reflection surface 103c that totally reflects the light beam from the incident surface 103a. The light guiding member 103 includes a first exiting surface 103b, and the first exiting surface 103b outputs the light beam (direct light beam) incident from the incident surface 103a and the reflected light (reflected light beam) reflected from the total reflection surface 103c while refracting the direct light beam and the reflected light beam. The light guiding member 103 includes a second exiting surface 103d, and the second exiting surface 103d outputs the light beam (direct light beam) incident from the incident surface 103a onto the side of the original 104 while refracting the direct light beam.

In the sub scanning section, the incident surface 103a of the light guiding member 103 is inclined by a predetermined angle θ with respect to a reading direction (Y-direction) of the original (original surface) 104 that is of the illumination object, and the incident surface 103a is provided such that the light beam emitted from the light source unit 101, in which the light intensity becomes the maximum, is directly incident thereto.

In the sub scanning section, the total reflection surface 103c of the light guiding member 103 of the embodiment is formed so as to be widened toward a reading position 106 in the direction (X-direction) perpendicular to the reading direction of the original surface 104.

In the embodiment, an intersection Q between an exiting axis in which the light intensity of the light beam emitted from light source unit 101 becomes the maximum and the original surface (illumination object) and the position 106 in which the illuminated original surface 104 is read are disposed while separated from each other in the reading direction (Y-direction).

As to a luminous intensity angle characteristic of the LED of the light source unit 101, the light quantity becomes the maximum in a direction normal to the light emitting surface 105, and the light quantity is gradually decreased with increasing gradient from the surface normal. Therefore, in FIG. 1, the light beam having the highest intensity is incident to the incident surface 103a of the light guiding member 103 that is located in the center or immediately above the neighborhood of the center of the light emitting surface 105 of the light source unit 101.

At this point, when the incident surface (refraction surface) 103a of the light guiding member 103 is inclined in the direction of the reading position 106 of the original surface 104, a light beam a having the highest intensity, which is incident to the incident surface 103a, is refracted and deflected in the direction of the reading position 106. The deflected light beam a exits from the exiting surface 103b to reach the original surface 104 above the cover glass 108.

After a light beam b that exits with an incline with respect to the line normal to the light emitting surface 105 is incident to the incident surface 103a, the light beam b is totally reflected from the total reflection surface 103c, and the light beam b exits from the exiting surface 103b to reach the original surface 104 above the cover glass 108.

After a light beam c that exits with an incline in the opposite direction to the light beam b with respect to the line normal to the light emitting surface 105 is incident to the incident surface 103a, the light beam c exits from the exiting surface 103d to reach the original surface 104 above the cover glass 108.

The light beam a having the highest intensity is deflected by the incident surface 103a of the light guiding member 103, which allows the light beam a to be guided to the reading position 106 of the original surface 104 which is disposed at a position separated, in the reading direction (Y-direction), from the intersection Q between the exiting axis in which the light intensity of the light beam emitted from light source unit 101 becomes the maximum and the original surface without inclining the board 102 with respect to the reading position 106 of the original surface 104.

The light beam that exits with the angle with respect to the light beam a having the highest intensity is guided to the original surface 104 using functions of the total reflection surface and refraction plane, thereby reducing the change in illuminance caused by the variation in position of the original 104 (when the original 104 varies in the Z-direction).

In the sub scanning section, preferably the light beam a that exits in the normal direction from the center of the light emitting surface 105 is deflected toward a position in the original reading surface side of an original-reading-surface-side end portion of the light emitting surface. Further, preferably the position where the light beam a reaches in the sub scanning section including the original reading position is in a side of an intersection Q between the sub scanning section and the normal to the light emitting surface 105 of a position farther distant away from the reading position 106 to an extent of a half of a length in the sub scanning direction of the light emitting surface 105.

It is assumed that P is a length in the sub scanning direction of the light emitting surface 105 of the light source unit 101, it is assumed that H is a distance in an original reading axis direction F from the light emitting surface 105 to the reading position 106 of the illumination object (original) 104, and it is assumed that L is a separation amount between a center axis S of the light emitting surface 105 and a reading axis F of the illumination object 104 in the sub scanning direction. It is assumed that θ is an angle formed between the light emitting surface 105 and the incident surface 103a, and it is assumed that n is a refractive index of a material of the light guiding member 103. At this point, the light beam emitted from the center of the light emitting surface 105 in the direction of the normal to the light emitting surface 105 is incident on the incident surface 103a of the light guiding member 103 at the position of H-(P tan θ)/2 from the original reading position 106 in the direction parallel to the reading axis direction F, and is deflected.

The light beam is deflected in the position by the light guiding member 103, and the deflected angle becomes θ-+arcsin((sin θ)/n) with respect to the direction normal to the light emitting surface 105.

Therefore, a displacement amount of the light beam in the direction of the reading position 106 is obtained by dividing H-(P tan θ)/2 by tan(90-θ+arcsin((sin θ)/n)), and $$\frac{P}{2} < \frac{H - \frac{P\tan\theta}{2}}{\tan\left(90 - \theta + \arcsin\frac{\sin\theta}{n}\right)} < L + \frac{P}{2} \quad (1)$$

is obtained from the preferable conditions.

In the embodiment, when each component is set so as to satisfy the conditional expression (1), the change in illuminance is decreased even if the original surface (illuminated surface) 104 flutters.

First Embodiment

An illuminator according to a first embodiment of the invention will be described below.

Figure 2:
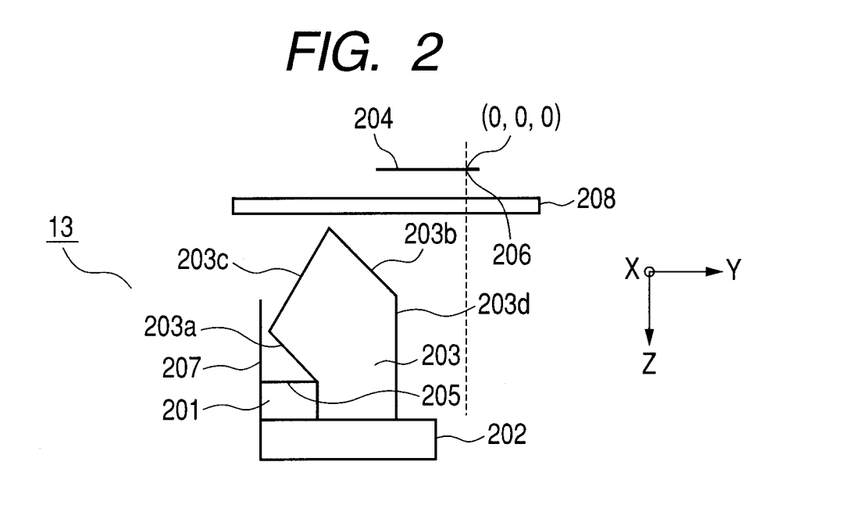
FIG. 2 is a sectional view illustrating sub scanning of an illuminator according to a first embodiment of the invention.
Figure 3:
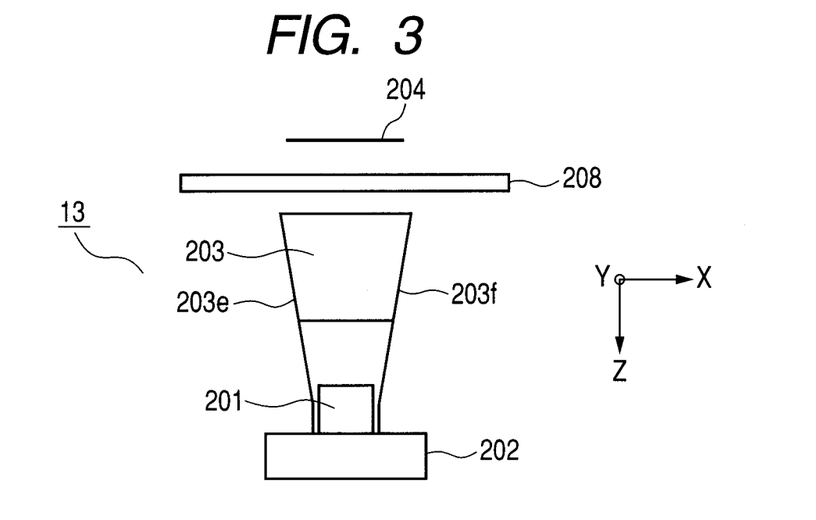
FIG. 3 is a sectional view illustrating main scanning of an illuminator of the first embodiment.

FIG. 2 is a sectional view illustrating the sub scanning of the illuminator of the first embodiment, and illustrates the state in which the illuminator and the original that is of the illumination object having the image information are disposed. FIG. 3 is a sectional view illustrating the main scanning of the illuminator of the first embodiment, and illustrates the state in which the illuminator and the original that is of the illumination object having the image information are disposed. FIGS. 2 and 3 illustrate the state in which the original that is of the illumination object varies (flutters) in the thickness direction (Z-direction) of the original in conveying the original.

In FIGS. 2 and 3, a light source unit 201 includes a top view type white LED, and is mounted on a board 202. The LED 201 of the first embodiment has a characteristic in which the light intensity distribution of the emitted light beam varies according to the exit angle from a light emitting surface (light source surface) 205.

A light guiding member 203 is mounted on the board 202 by a bonding agent similarly to the light source unit 201, and guides the light beam emitted from the light source unit 201 to an original (illumination object) 204 above a cover glass 208.

The light source unit 201 and the light guiding member 203 constitute one of components of an illuminator 13.

The light guiding member 203 includes an incident surface 203a to which the light beam is incident from the light source unit 201 in a refractive manner. The light guiding member 203 includes a total reflection surface 203c that totally reflects the light beam incident from the incident surface 203a. The light guiding member 203 includes reflection surfaces 203e and 203f that reflect the light beams incident from the incident surface 203a. The light guiding member 203 includes a first exiting surface 203b, and the first exiting surface 203b outputs the light beam incident from the incident surface 203a and the reflected light beam reflected from the total reflection surface 203c while refracting the light beam and the reflected light beam. The light guiding member 203 includes a second exiting surface 203d, and the second exiting surface 203d outputs the light beam incident from the incident surface 203a and the reflected light beams reflected from reflection surfaces 203e and 203f while refracting the light beam and the reflected light beams.

An original plate 208 includes a cover glass, and the original 204 is conveyed in the sub scanning direction (Y-direction) on the top portion of the original plate 208.

The original 204 is illuminated with the light beam emitted from the light source unit 201 through the light guiding member 203 when passing on the top portion of the original plate 208 in the sub scanning direction. The diffusion reflected light that is reflected and diffused by the original surface 204 is guided to a line sensor (CCD) by a reading optical system (not illustrated).

In the first embodiment, as to the luminous intensity angle characteristic of the white LED of the light source unit 201, the light quantity becomes the maximum in, the direction normal to the light emitting surface 205, and the light quantity is gradually decreased with increasing gradient from the surface normal. At this point, when the white LED has a good rendering property, color unevenness can be reduced on the original surface.

The light guiding member 203 takes a large portion of the light beam emitted from the light source unit 201 from the incident surface 203a, and deflects the light beam in the direction of the original surface 204.

When the light guiding member 203 is formed into the shape of FIGS. 2 and 3, the light source unit 201 and the light guiding member 203 can be retained by the same board 202 to contribute to miniaturization of the illuminator (illumination system). At this point, because the light guiding member 203 cannot take the light beam that is emitted from the light source unit 201 to the left of FIG. 2, a sheet-like reflecting plate or a diffusion sheet that is of a reflecting member 207 is disposed around the light source unit 201 to reduce a light quantity loss.

The original surface 204 is illuminated with the light beam that is incident to the incident surface 203a of the light guiding member 203 from the light source unit 204 through nine optical paths 1 to 9.

In the optical path 1, the light beam incident to the incident surface 203a travels in the light guiding member 203, and the light beam exits from the exiting surface 203b to reach the original surface 204.

In the optical path 2, the light beam incident to the incident surface 203a travels in the light guiding member 203, is totally reflected from the total reflection surface 203c, travels in the light guiding member 203, and exits from the exiting surface 203b to reach the original surface 204.

In the optical path 3, the light beam incident to the incident surface 203a travels in the light guiding member 203, and the light beam exits from the exiting surface 203d to reach the original surface 204.

In the optical paths 4, 5, and 6, the light beam is reflected from the reflection surface 203e of the light guiding member 203 of FIG. 3 in the middle of the optical paths 1, 2, and 3.

That is, in the optical path 4, the light beam incident to the incident surface 203a travels in the light guiding member 203, is reflected from the reflection surface 203e, travels in the light guiding member 203, and exits from the exiting surface 203b to reach the original surface 204.

In the optical path 5, the light beam incident to the incident surface 203a travels in the light guiding member 203, is totally reflected from the total reflection surface 203c, is reflected from the reflection surface 203e, travels in the light guiding member 203, and exits from the exiting surface 203b to reach the original surface 204.

In the optical path 6, the light beam incident to the incident surface 203a travels in the light guiding member 203, is reflected from the reflection surface 203e, travels in the light guiding member 203, and exits from the exiting surface 203d to reach the original surface 204.

In the optical paths 7, 8, and 9, the light beam is reflected from the reflection surface 203f of the light guiding member 203 of FIG. 3 in the middle of the optical paths 1, 2, and 3.

That is, in the optical path 7, the light beam incident to the incident surface 203a travels in the light guiding member 203, is reflected from the reflection surface 203f, travels in the light guiding member 203, and exits from the exiting surface 203b to reach the original surface 204.

In the optical path 8, the light beam incident to the incident surface 203a travels in the light guiding member 203, is totally reflected from the total reflection surface 203c, is reflected from the reflection surface 203f, travels in the light guiding member 203, and exits from the exiting surface 203b to reach the original surface 204.

In the optical path 9, the light beam incident to the incident surface 203a travels in the light guiding member 203, is reflected from the reflection surface 203f, travels in the light guiding member 203, and exits from the exiting surface 203d to reach the original surface 204.

The original surface 204 is illuminated with the light beam having passed through the nine optical paths 1 to 9, thereby providing an illumination system in which the light quantity is secured while the variation in light quantity is decreased in the fluttering of the original surface 204, that is, variation in the thickness direction (Z-direction) of the original 204 during the conveyance of the original.

Figure 4:
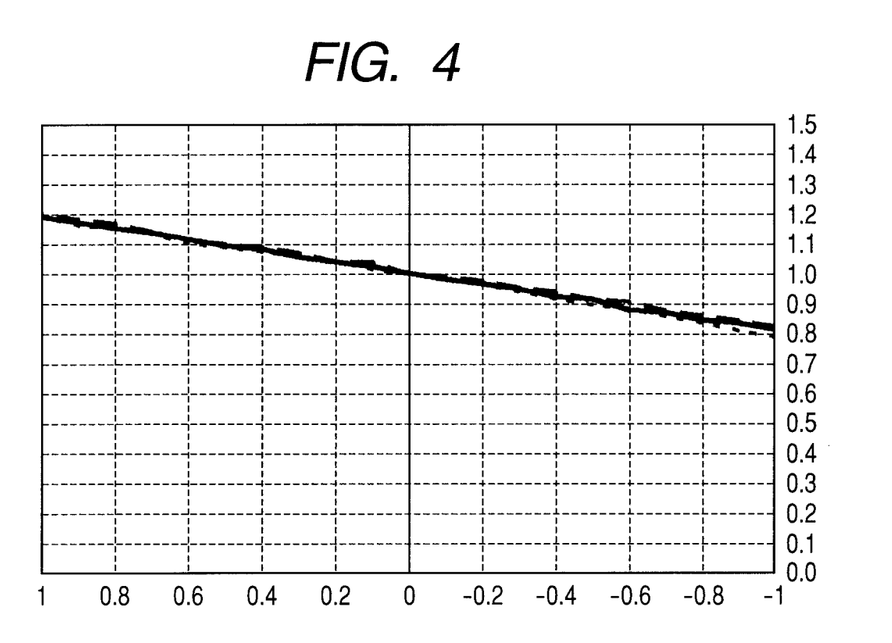
FIG. 4 is a graph illustrating a change in light quantity in an original surface position and positions of 0.5 mm below and above the original surface position in the first embodiment.

FIG. 4 is a graph illustrating a light quantity distribution when the original surface 204 varies by 0.5 mm in the thickness direction (Z-direction) of the original. In FIG. 4, a horizontal axis indicates a position in the sub scanning direction (Y-direction), and "0" indicates a reading center 206. A vertical axis indicates the light quantity that is normalized to be 1 when the fluttering is not generated in the reading center 206. In FIG. 4, three lines indicate the position of the original surface 204 and positions of 0.5 mm below and above the position of the original surface 204 in the thickness direction (Z-direction).

In the first embodiment, the change in light quantity of the reading position 206 in the sub scanning direction can be corrected by shading.

A numerical example 1 of the light guiding member 103 of the first embodiment will be described below.

Assuming that Y is an original conveying direction, X is a direction perpendicular to the Y-direction in the original surface, Z is a direction normal to the original surface, and ($\alpha$, $\beta$, $\gamma$) is a rotation angle about a rotation axis of each of the X-, Y-, and Z-directions, the numerical example 1 expresses the coordinate (X,Y,Z) and the rotation angle ($\alpha$, $\beta$, $\gamma$) in each surface of the light guiding member. The same holds true for a numerical example 2.

Reading position 206 of original surface: coordinate (0,0,0) and rotation angle (0,0,0)

Board 202: upper-surface coordinate (0,0,−13) and rotation angle (0,0,0)

Light emitting surface 205 of LED: center coordinate (0,8,−11) and rotation angle (0,0,0)

Incident surface 203a of light guiding member: coordinate (0,8,−9.5) and rotation angle (45,0,0)

Exiting surface 203b of light guiding member: coordinate (0,3.5,−5.5) and rotation angle (45,0,0)

Reflection surface 203c of light guiding member: coordinate (0,8,−6.5) and rotation angle (−60,0,0)

Exiting surface 203d of light guiding member: coordinate (0,2.5,−8) and rotation angle (−90,0,0)

Reflection surface 203e of light guiding member: coordinate (−1.46,8,−11) and rotation angle (0,80,0)

Reflection surface 203f of light guiding member: coordinate (1.46,8,−11) and rotation angle (0,−80,0)

Cover glass 208: coordinate (0,0,−1.5), rotation angle (0,0,0), and thickness of 0.7 mm A light guiding member is made of acryl.

In the first embodiment, the length P (see FIG. 1) in the sub scanning direction of the light emitting surface 205 of the light source unit 201 and the distance H from the light emitting surface 205 to the reading position 206 of the original surface (illumination object) 204 are set as follows. The separation length L between the center axis S of the light emitting surface 205 and the reading axis F of the illumination object, the angle θ formed between the light emitting surface 205 and the incident surface 201a, and the refractive index n of the material of the light guiding member 203 are set as follows.
P=2.4 (mm),
H=11.5 (mm),
L=8 (mm),
θ=45 (°), and
n=1.4915
Therefore, $$P/2=1.2,$$

$$\frac{H-\frac{P\tan\theta}{2}}{\tan\left\{90-\theta+\arcsin\frac{\sin\theta}{n}\right\}}=3.09,$$

and $$L+P/2=9.2$$

These satisfy the conditional expression (1).

As described above, in the illuminator of the first embodiment in which the light guiding member is used, the change in illuminance can be reduced even if the illuminated surface (original surface) varies, and the compact, high-illumination-efficiency illuminator can be implemented.

Second Embodiment

An illuminator according to a second embodiment of the invention will be described below.

Figure 5:
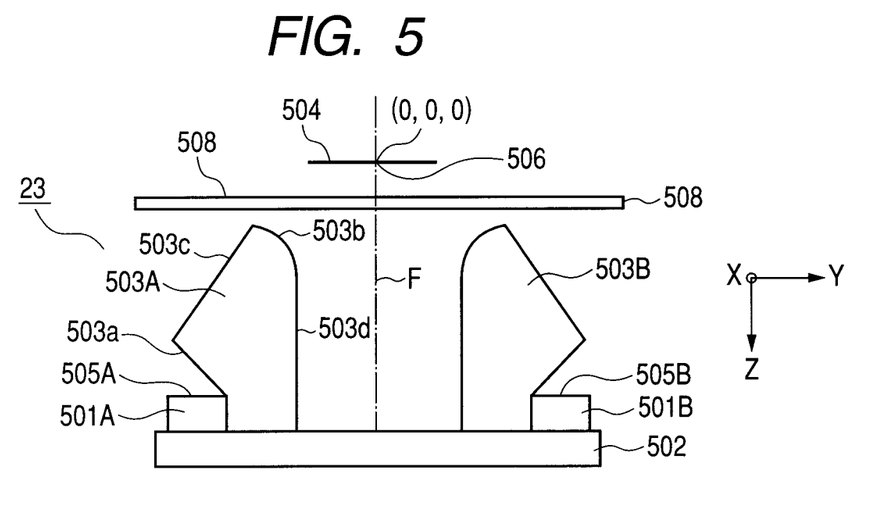
FIG. 5 is a sectional view illustrating sub scanning of an illuminator according to a second embodiment of the invention.
Figure 6:
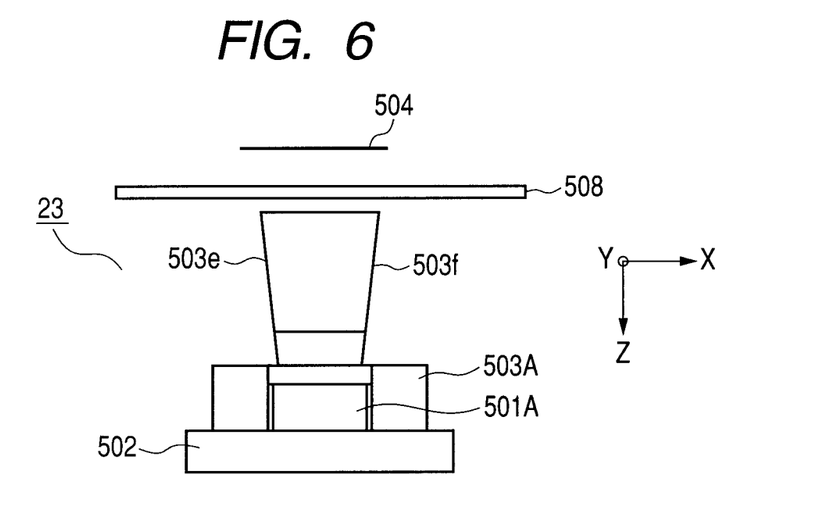
FIG. 6 is a sectional view illustrating main scanning of an illuminator of the second embodiment.

FIG. 5 is a sectional view illustrating the sub scanning of the illuminator of the second embodiment, and FIG. 5 illustrates the state in which the illuminator and the original that is of the illumination object having the image information are disposed. FIG. 6 is a sectional view illustrating the main scanning of the illuminator of the second embodiment, and illustrates the state in which the illuminator and the original that is of the illumination object having the image information are disposed. FIGS. 5 and 6 illustrate the state in which the original that is of the illumination object varies (flutters) in the thickness direction (Z-direction) of the original in conveying the original.

The second embodiment differs from the first embodiment in that light source units 501A and 501B and light guiding members 503A and 503B are disposed on both sides in the reading direction with respect to the reading axis F of an illumination object (original) 504. Additionally, exiting surfaces 503b and 503d of the light guiding members 503A and 503B are formed into cylindrical shapes. Other configurations and optical functions are similar to those of the first embodiment, and therefore the similar effect is obtained in the second embodiment.

In FIGS. 5 and 6, for example, the light source units 501A and 501B including the top view type white LEDs are mounted on a board 502. The LEDs 501A and 501B of the second embodiment have characteristics in which the light intensity distribution of the emitted light beam varies according to the exit angle from each of the light emitting surfaces 505A and 505B.

The light guiding members 503A and 503B are mounted on the board 502 by a bonding agent similarly to the light source units 501A and 501B, and guide the light beams emitted from the light source units 501A and 501B to an original (illumination object) 504 above a cover glass 508, respectively.

The light source units 501A and 501B and the light guiding members 503A and 503B constitute one of components of an illuminator 23.

In the second embodiment, the light guiding members 503A and 503B are symmetrically formed in relation to the reading axis F. Therefore, only the shape and optical function of the light guiding member 503A will be described below.

The light guiding member 503A includes an incident surface 503a to which the light beam is incident from the light source unit 501A in a refractive manner. The light guiding member 503A includes a total reflection surface 503c that totally reflects the light beam incident from the incident surface 503a. The light guiding member 503A includes reflection surfaces 503e and 503f that reflect the light beams incident from the incident surface 503a. The light guiding member 503A includes a first exiting surface 503b, and the first exiting surface 503b outputs the light beam incident from the incident surface 503a and the reflected light beam reflected from the total reflection surface 503c while refracting the light beam and the reflected light beam. The light guiding member 503A includes a second exiting surface 503d, and the second exiting surface 503d outputs the light beam incident from the incident surface 503a and the reflected light beams reflected from reflection surfaces 503e and 503f while refracting the light beam and the reflected light beams.

The first and second exiting surfaces 503b and 503d are formed into cylindrical shapes having predetermined powers (refractive powers) in the main scanning direction and the sub scanning direction, respectively.

An original plate 508 includes a cover glass, and the original 504 is conveyed in the sub scanning direction (Y-direction) on the top portion of the original plate 508.

The original 504 is illuminated from both sides with the light beams emitted from the light source units 501A and 501B through the light guiding members 503A and 503B when passing on the top portion of the original plate 508 in the sub scanning direction. The diffusion reflected light that is reflected and diffused by the original surface 504 is guided to a line sensor (CCD) by a reading optical system (not illustrated).

In the second embodiment, the light guiding members 503A and 503B have the shapes in which the light source LEDs 501A and 501B can be positioned thereby. Therefore, in the second embodiment, improvement of an assembling property is achieved.

In the second embodiment, plural light guiding members are used to illuminate the original 504 from both the sides, so that the light quantity can simply be increased. The change in light quantity caused by the change in position in the sub scanning direction can substantially be kept constant in front of and at the back of the reading position. Therefore, in the second embodiment, the correction amount can be decreased during the shading.

Figure 7:
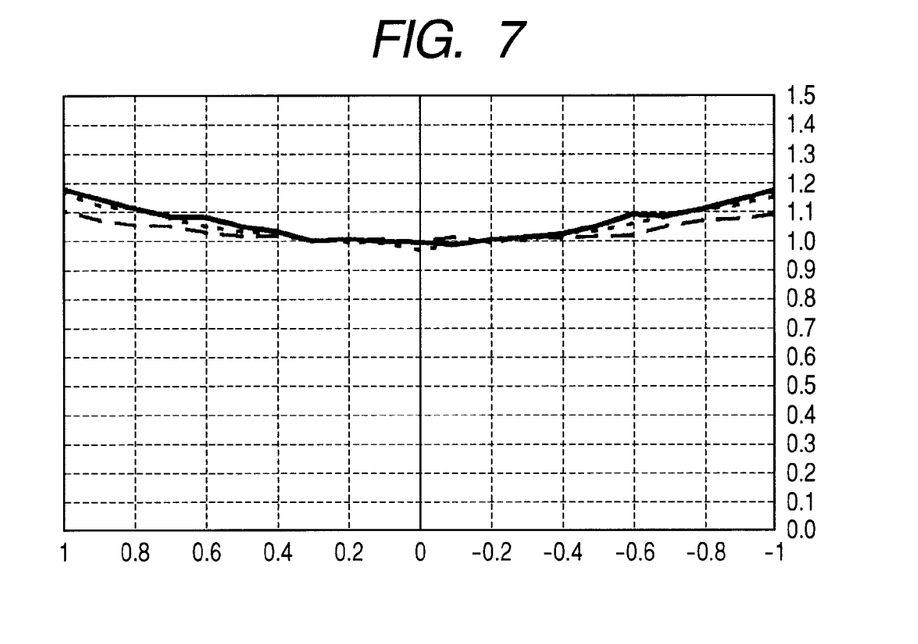
FIG. 7 is a graph illustrating a change in light quantity in the original surface position and positions of 0.5 mm below and above the original surface position in the second embodiment.

FIG. 7 is a graph illustrating a light quantity distribution when the original surface 504 of the second embodiment varies by 0.5 mm in the thickness direction (Z-direction) of the original. In FIG. 7, a horizontal axis indicates a position in the sub scanning direction (Y-direction), and "0" indicates the reading center. A vertical axis indicates the light quantity that is normalized to be 1 when the fluttering is not generated in the reading center. In FIG. 7, three lines indicate the position of the original surface 504 and positions of 0.5 mm below and above the position of the original surface 504 in the thickness direction (Z-direction).

The numerical example 2 of the light guiding member 503A of the second embodiment is illustrated below.

Reading position 504 of original surface: coordinate (0,0,0) and rotation angle (0,0,0)

Board 502: upper-surface coordinate (0,0,−13) and rotation angle (0,0,0)

Light emitting surface 505A of LED: center coordinate (0,9,−11) and rotation angle (0,0,0)

Light emitting surface 505B of LED: center coordinate (0,−9,−11) and rotation angle (0,0,0)

Incident surface 503a of light guiding member: coordinate (0,9,−9.5) and rotation angle (46,0,0)

Exiting surface 503b of light guiding member: coordinate (0,5.0,−4.0), rotation angle (46,0,0), and cylinder radius of 10 mm Reflection surface 503c of light guiding member: coordinate (0,8.0,−5.5) and rotation angle (−55,0,0)

Exiting surface 503d of light guiding member: coordinate (0,4.0,−9.0) and rotation angle (90,0,0)

Reflection surface 503e of light guiding member: coordinate (−1.5,9.0,−11) and rotation angle (0,85,0)

Reflection surface 503f of light guiding member: coordinate (1.5,9.0,−11.0) and rotation angle (0,−85,0)

The light guiding member 503B has a symmetric shape in relation to the reading axis F (reading position 506).

Cover glass 508: coordinate (0,0,−1.5), rotation angle (0,0,0), and thickness of 0.7 mm The light guiding members 503A and 503B are made of acryl.

Third Embodiment

Figure 8:
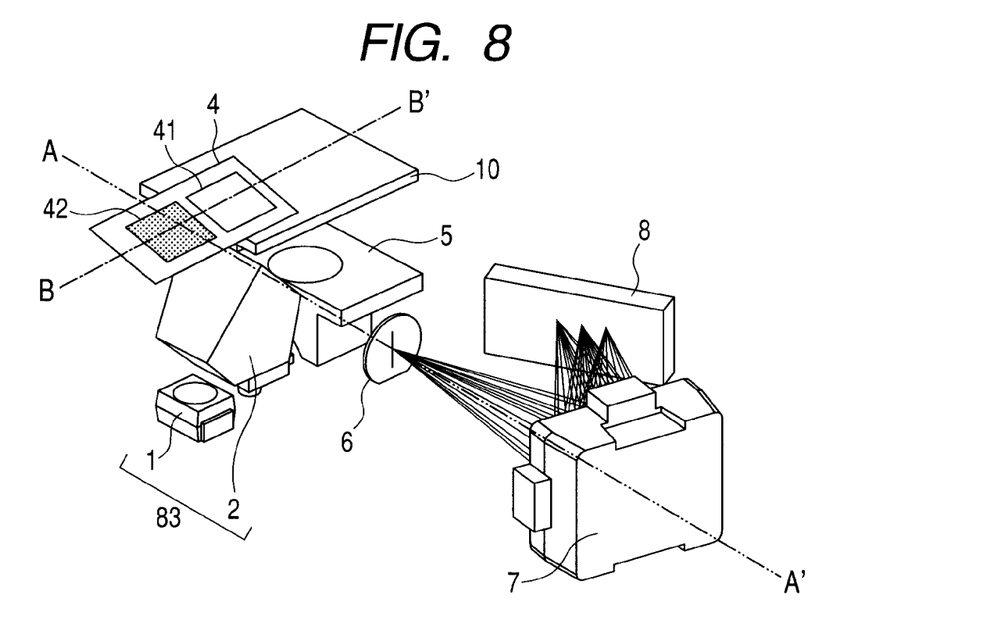
FIG. 8 is a perspective view illustrating a main part of a spectral apparatus in which the illuminator of the first and second embodiments is used.

FIG. 8 is a perspective view illustrating a main part of a spectral apparatus in which the illuminators of the first and second embodiments are used.

Referring to FIG. 8, an illuminator 83 includes a light source unit 1 and a light guiding member 2 that guides the light beam from the light source unit 1 to an original (original surface) 4 above an original plate 10. The reflected light (tested light beam) from the original (illumination object) 4 illuminated by the illuminator 83 is guided to an incident slit 6 through a light guiding element (prism) 5. A concave reflection type diffraction element 7 collects the light beam having passed through the incident slit 6 while dispersing the light beam in plural light beams, and an image is formed as a slit image in each wavelength on a light receiving element array 8 that is of the light receiving unit.

In the light receiving element array 8, the light quantity in each wavelength can be converted into an electric signal to obtain spectral intensity information. The spectral intensity information obtained by the spectral apparatus is transmitted to an analyzer (not illustrated), and the analyzer can act as a color measurement apparatus that computes absolute chromaticity of the original (illumination object) from an internal table based on the transmitted spectral intensity information.

In FIG. 8, an optical axis B-B' of the optical system includes a conveying direction of the original 4, and an optical axis A-A' includes the light guiding element 5. The numerals 41 and 42 designate cyan and magenta test patterns (original), respectively.

In FIG. 8, the cyan and magenta test patterns 41 and 42 are illustrated as the test pattern. Alternatively, another color test pattern may be used.

The spectral apparatus in which the illuminators of the first and second embodiments are used relates to a color sensor in which a diffraction grating is used to identify or measure a color of an object, and particularly the spectral apparatus is suitably used to measure the color of the toner or printing medium in an image forming apparatus such as a laser beam printer.

Not only the spectral apparatus in which the illuminators of the first and second embodiments are used can be used as the image forming apparatus, but also the spectral apparatus can be used as a spectral color measurement apparatus such as a white balance sensor for a digital camera and other measurement apparatuses.

Fourth Embodiment

Figure 9:
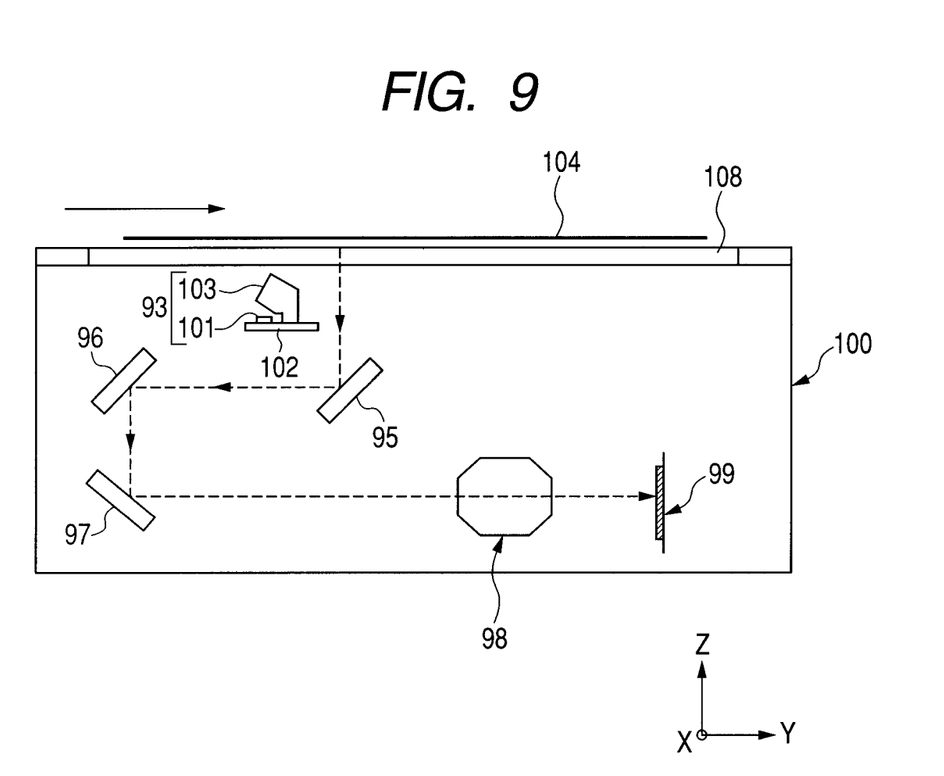
FIG. 9 is a schematic diagram illustrating a main part of an image reading apparatus in which the illuminator of the first and second embodiments is used.

FIG. 9 is a schematic diagram illustrating a main part of an image reading apparatus 100 in which the illuminators of the first and second embodiments are used. FIG. 9 illustrates the state in which the original that is of the illumination object varies (flutters) in the thickness direction (Z-direction) of the original in conveying the original. In FIG. 9, the same component as that of FIG. 1 is designated by the same numeral.

Referring to FIG. 9, an illuminator 93 includes the light source unit 101 and the light guiding member 103.

In the image reading apparatus of the fourth embodiment, the illuminator 93 illuminates the original 104 when the original 104 passes on the top of the original plate 108 in the sub scanning direction. The reflected light (reflected light beam) based on the image information from the illuminated original 104 forms an image on the surface of a CCD 99 that is of the reading unit by an image formation lens 98 that is of the image formation optical system through first, second, and third reflecting mirrors 95, 96, and 97. Because the original 104 is sequentially conveyed on the top of the original plate 108, the image information on the original 104 is sequentially read in the sub scanning direction in the meantime.

In the fourth embodiment, the image information on the original 104 is read while the original 104 is moved in the sub scanning direction. Alternatively, the image information on the original 104 may be read while the original 104 and a main body 100 including the reading optical system are relatively moved.

In the fourth embodiment, the illuminators of the first and second embodiments are applied to the 1:2 scanning type image reading apparatus. Alternatively, the illuminators of the first and second embodiments may be applied to an integral type (flatbed type) image reading apparatus.

Although the preferred embodiments of the invention are described above, the invention is not limited to the embodiments, but various changes and modifications can be made without departing from the scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2009-110282, filed Apr. 30, 2009, and No. 2010-085801, filed Apr. 2, 2010, which are hereby incorporated by reference herein in their entirety.

What is claimed is:

1. An illuminator comprising:
 a light source unit; and
 a light guiding member that guides a light beam to an original disposed on an original plate,
 wherein, in a sub scanning section, an intersection of a center axis of a light emitting surface of the light source unit and the original plate is separated from a reading position of the original in a sub scanning direction, wherein the light guiding member includes:
- an incident surface to which the light beam emitted from the light source unit is incident;
- a reflection surface that reflects the light beam incident from the incident surface; and
- an exiting surface that outputs the light beam incident from the incident surface and the light beam reflected from the reflection surface, wherein in the sub scanning section, the light beam having the highest light intensity in the light beams outputted from the light source unit is deflected at the incident surface toward the reading position of the original with respect to a center axis of the light emitting surface, and wherein in the sub scanning section, including the reading position, the light beam having the highest light intensity reaches onto the original plate at a position away from the reading position in a side where the center axis of the light emitting surface intersects with the original plate by farther a half of a length in the sub scanning direction of the light emitting surface.

2. The illuminator according to claim 1, wherein a condition of $$\frac{P}{2} < \frac{H - \frac{P\tan\theta}{2}}{\tan\left(90 - \theta + \arcsin\frac{\sin\theta}{n}\right)} < L + \frac{P}{2}$$

is satisfied, where P (mm) is a length in the sub scanning direction of a light emitting surface of the light source unit, H (mm) is a distance in the original reading axis direction from the light emitting surface to the original reading position, L (mm) is a separation amount in the sub scanning direction between the center axis of the light emitting surface and the original reading axis, $\theta$ (°) is an angle formed between the light emitting surface and the incident surface in the sub scanning section, and n is a refractive index of a material of the light guiding member.

3. The illuminator according to claim 1, wherein the light source unit includes an LED that has a characteristic in which a light intensity distribution of the emitted light beam varies according to an exit angle with respect to the light emitting surface.

4. The illuminator according to claim 1, wherein, in the sub scanning section, the light source unit and the light guiding member are disposed on both sides of the original reading axis.

5. A spectral apparatus comprising:
an illuminator comprising:
- a light source unit; and
- a light guiding member that guides a light beam to an original disposed on an original plate, wherein, in a sub scanning section, an intersection of a center axis of a light emitting surface of the light source unit and the original plate is separated from a reading position of the original in a sub scanning direction, wherein the light guiding member includes:
- an incident surface to which the light beam emitted from the light source unit is incident;
- a reflection surface that reflects the light beam incident from the incident surface; and
- an exiting surface that outputs the light beam incident from the incident surface and the light beam reflected from the reflection surface, wherein in the sub scanning section, the light beam having the highest light intensity in the light beams outputted from the light source unit is deflected at the incident surface toward the reading position of the original with respect to a center axis of the light emitting surface, and wherein in the sub scanning section, including the reading position, the light beam having the highest light intensity reaches onto the original plate at a position away from the reading position in a side where the center axis of the light emitting surface intersects with the original plate by farther a half of a length in the sub scanning direction of the light emitting surface; and a spectral unit that disperses a light beam diffused by the original illuminated with the light beam outputted from the illuminator into spectrum to output the spectrum to a light receiving unit.

6. An image reading apparatus comprising:
an illuminator comprising:
- a light source unit; and
- a light guiding member that guides a light beam to an original disposed on an original plate, wherein, in a sub scanning section, an intersection of a center axis of a light emitting surface of the light source unit and the original plate is separated from a reading position of the original in a sub scanning direction, wherein the light guiding member includes:
- an incident surface to which the light beam emitted from the light source unit is incident;
- a reflection surface that reflects the light beam incident from the incident surface; and
- an exiting surface that outputs the light beam incident from the incident surface and the light beam reflected from the reflection surface, wherein in the sub scanning section, the light beam having the highest light intensity in the light beams outputted from the light source unit is deflected at the incident surface toward the reading position of the original with respect to a center axis of the light emitting surface, and wherein in the sub scanning section, including the reading position, the light beam having the highest light intensity reaches onto the original plate at a position away from the reading position in a side where the center axis of the light emitting surface intersects with the original plate by farther a half of a length in the sub scanning direction of the light emitting surface; and an image formation optical system that forms an image of image information on the original illuminated with the light beam outputted from the illuminator to a reading unit.

* * * * *